United States Patent
Liu et al.

(10) Patent No.: US 10,911,247 B2
(45) Date of Patent: Feb. 2, 2021

(54) PHOTON-BASED CA AUTHENTICATION METHOD AND SYSTEM

(71) Applicant: KUANG-CHI INTELLIGENT PHOTONIC TECHNOLOGY LTD., Shenzhen (CN)

(72) Inventors: Ruopeng Liu, Shenzhen (CN); Xudong Wang, Shenzhen (CN)

(73) Assignee: Kuang-Chi Intelligent Photonic Technology Ltd., Shenzhen (CN)

( * ) Notice: Subject to any disclaimer, the term of this patent is extended or adjusted under 35 U.S.C. 154(b) by 219 days.

(21) Appl. No.: 15/956,773

(22) Filed: Apr. 19, 2018

(65) Prior Publication Data

US 2018/0241576 A1 Aug. 23, 2018

Related U.S. Application Data

(63) Continuation of application No. PCT/CN2016/101972, filed on Oct. 13, 2016.

(30) Foreign Application Priority Data

Oct. 28, 2015 (CN) .......................... 2015 1 0716528

(51) Int. Cl.
*H04L 29/06* (2006.01)
*H04L 9/32* (2006.01)
(Continued)

(52) U.S. Cl.
CPC ............ *H04L 9/3268* (2013.01); *G06F 21/35* (2013.01); *G06K 9/00087* (2013.01);
(Continued)

(58) Field of Classification Search
CPC .............. H04L 9/3268; H04L 63/0823; H04L 2209/38; H04L 9/3263; H04L 9/0852;
(Continued)

(56) References Cited

U.S. PATENT DOCUMENTS

2003/0065920 A1* 4/2003 Benantar ............. H04L 63/0823
713/175
2006/0088157 A1* 4/2006 Fujii ..................... H04L 9/0858
380/30
(Continued)

FOREIGN PATENT DOCUMENTS

CN 1696967 A 11/2005
CN 101504732 A 8/2009
(Continued)

OTHER PUBLICATIONS

Extended European Search Report for corresponding European Application No. 16858914.1, dated May 24, 2019, 7 pages.

*Primary Examiner* — Trong H Nguyen
(74) *Attorney, Agent, or Firm* — Armstrong Teasdale LLP

(57) ABSTRACT

The present application provides a photon-based CA authentication method, including: receiving, by a photon-based CA authentication terminal, an optical signal from a photon terminal, where the optical signal includes a user ID; verifying the user ID included in the optical signal; and providing, in response to successful user ID verification, a user certificate to a client to perform CA certificate authentication.

14 Claims, 2 Drawing Sheets

(51) Int. Cl.
  *G06F 21/35* (2013.01)
  *H04W 12/06* (2021.01)
  *H04B 10/114* (2013.01)
  *H04L 9/08* (2006.01)
  *G06K 9/00* (2006.01)
  *H04B 10/70* (2013.01)
  *H04B 10/85* (2013.01)

(52) U.S. Cl.
  CPC ........... *H04B 10/114* (2013.01); *H04B 10/70* (2013.01); *H04B 10/85* (2013.01); *H04L 9/0822* (2013.01); *H04L 9/321* (2013.01); *H04L 9/3231* (2013.01); *H04L 63/0823* (2013.01); *H04L 63/0861* (2013.01); *H04W 12/06* (2013.01); *H04L 2209/38* (2013.01)

(58) Field of Classification Search
  CPC ..... H04L 9/0855; H04L 9/0858; H04B 10/70; H04W 12/06
  See application file for complete search history.

(56) References Cited

U.S. PATENT DOCUMENTS

2009/0175452 A1* 7/2009 Gelfond ............... H04L 9/0855
                                                              380/277
2009/0265545 A1* 10/2009 Satoh .................... H04L 9/3263
                                                              713/156
2013/0001291 A1* 1/2013 Ibrahimbegovic ..........................
                                                              H04L 63/0823
                                                              235/375
2013/0083926 A1* 4/2013 Hughes ................. H04L 9/0836
                                                              380/278
2014/0304500 A1* 10/2014 Sun ..................... H04L 63/0471
                                                              713/153
2015/0089228 A1* 3/2015 Kim .................... H04L 63/1483
                                                              713/170
2015/0222619 A1* 8/2015 Hughes .................. H04L 63/08
                                                              713/168
2016/0050213 A1* 2/2016 Storr ....................... G06F 21/32
                                                              726/6

FOREIGN PATENT DOCUMENTS

| | | | |
|---|---|---|---|
| CN | 101707594 A | 5/2010 | |
| CN | 102640449 A | 8/2012 | |
| CN | 102710611 A | 10/2012 | |
| CN | 102916970 A | 2/2013 | |
| CN | 203180938 U | 9/2013 | |
| CN | 103929310 A | 7/2014 | |
| EP | 0946022 A2 | 9/1999 | |
| EP | 1278333 A1 * | 1/2003 | ........... H04L 9/3263 |
| EP | 1278333 A1 | 1/2003 | |
| GB | 2360617 A | 9/2001 | |
| WO | 2004089029 A1 | 10/2004 | |
| WO | WO-2004089029 A1 * | 10/2004 | ......... H04L 63/0823 |

\* cited by examiner

PHOTON-BASED CA AUTHENTICATION METHOD AND SYSTEM

CROSS REFERENCE TO RELATED APPLICATIONS

This application is a continuation of PCT Application No. PCT/CN2016/101972 filed on Oct. 13, 2016, which claims priority to Chinese patent application No. 201510716528.3 filed Oct. 28, 2015, both of which are incorporated herein by reference.

TECHNICAL FIELD

The present application relates to a CA authentication, and in particular, to an optical communication-based photon-based CA authentication method and system.

BACKGROUND

A CA (Certificate Authority) digital certificate is issued by an authorization center of an authority agency, and can be used to identify an identity of an opposite party. A digital certificate is a file that is digitally signed by a certificate authorization center and that contains public key owner information and a public key. The CA digital certificate can perform security authentication in a safe and effective manner, but has such drawbacks as digital certificate abuse or theft.

A visible light communication technology is a new-type wireless optical communication technology developed based on the LED technology. Communication is performed by using blinking of an LED light source at a high frequency, and a transmission rate of the visible light communication can reach a maximum of gigabits per second. The visible light communication has rich spectrum resources that common wireless communication such as microwave communication does not have. In addition, the visible light communication can be applied to any communication protocol and any environment, and the visible light communication features a flexible, convenient, and low-cost device setup, and is applicable to large-scale popularization and application.

SUMMARY

The following provides a brief overview of one or more aspects to provide a basic understanding of these aspects. The overview is not a detailed overview of all conceived aspects and is neither intended to identify a key or decisive element of all aspects nor attempted to define a scope of any or all aspects. A sole purpose of the overview is to provide some concepts of one or more aspects in a simplified form, so as to provide a more detailed description later.

According to a first aspect of the present application, a photon-based CA authentication method is provided, including:

receiving, by a photon-based CA authentication terminal, an optical signal from a photon terminal, where the optical signal includes a user ID;

verifying the user ID included in the optical signal; and providing, in response to successful user ID verification, a user certificate to a client to perform CA certificate authentication.

In one embodiment, the method further includes: performing, by the photon terminal, user fingerprint recognition; and sending, in response to successful fingerprint recognition, the optical signal including the user ID.

In one embodiment, the verifying the user ID included in the optical signal includes: comparing the user ID included in the optical signal with a locally stored ID; and if the two are consistent, determining that the user ID verification is successful, or if the two are inconsistent, determining that the user ID verification fails.

In one embodiment, the method further includes: sending, in response to failed user ID verification, an error message to the client.

In one embodiment, the providing, in response to successful user ID verification, a user certificate to a client to perform CA certificate authentication includes: performing, in response to successful user ID verification, by the photon-based CA authentication terminal, PIN code verification; and providing, in response to successful PIN code verification, the user certificate to the client to perform the CA certificate authentication.

In one embodiment, the photon-based CA authentication terminal includes a CA authentication component and a photon processing component, and the performing PIN code verification includes: transferring, in response to successful user ID verification, by the photon processing component, a PIN code to the CA authentication component; and comparing, by the CA authentication component, the received PIN code with a locally stored PIN code, to perform the PIN code verification, and if the two are consistent, determining that the PIN code verification is successful, or if the two are inconsistent, determining that the PIN code verification fails.

In one embodiment, the PIN code sent by the photon processing component is a PIN code encrypted using a first key algorithm, and the PIN code locally stored by the CA authentication component is a PIN code encrypted using a second key algorithm, and the comparing, by the CA authentication component, the received PIN code with a locally stored PIN code includes: decrypting the received PIN code by using the first key algorithm; decrypting the locally stored PIN code by using the second key algorithm; and comparing the two decrypted PIN codes to perform the PIN code verification.

In one embodiment, the method further includes: sending, in response to failed PIN code verification, an error message to the client.

In one embodiment, the method further includes: submitting, by the client, the user certificate to a certificate authentication gateway, to perform the CA certificate authentication.

In one embodiment, the method further includes: submitting, by the client, the user certificate and a certificate device password input by the user to the certificate authentication gateway, to perform the CA certificate authentication.

According to another aspect of the present application, a photon-based CA authentication system is provided, including:

a photon-based CA authentication terminal, where the photon-based CA authentication terminal includes:

a photon processing component, configured to receive an optical signal from a photon terminal and verify a user ID included in the optical signal, and the photon-based CA authentication terminal provides, in response to successful user ID verification, a user certificate to a client to perform CA certificate authentication.

In one embodiment, the system further includes: the photon terminal, configured to perform user fingerprint recognition, and send, in response to successful fingerprint recognition, the optical signal including the user ID to the photon-based CA authentication terminal.

In one embodiment, the photon processing component includes: a storage unit, configured to store user ID; and a comparing unit, configured to compare the user ID included in the optical signal with a user ID locally stored in the storage unit; and if the two are consistent, determine that the user ID verification is successful, or if the two are inconsistent, determine that the user ID verification fails.

In one embodiment, the photon-based CA authentication terminal sends, in response to failed user ID verification, an error message to the client.

In one embodiment, the photon-based CA authentication terminal further includes a CA authentication component, configured to perform, in response to successful user ID verification, PIN code verification, and provide, in response to successful PIN code verification, the user certificate to the client to perform the CA certificate authentication.

In one embodiment, the storage unit of the photon processing component further stores a PIN code, and the photon processing component transfers, in response to successful user ID verification, the PIN code to the CA authentication component, and the CA authentication component includes: a storage unit, configured to store a PIN code; and a comparing unit, configured to compare the received PIN code with a locally stored PIN code, to perform the PIN code verification, and if the two are consistent, determine that the PIN code verification is successful, of if the two are inconsistent, determine that the PIN code verification fails.

In one embodiment, the PIN code sent by the photon processing component is a PIN code encrypted using a first key algorithm, and the PIN code locally stored by the CA authentication component is a PIN code encrypted using a second key algorithm, and the CA authentication component further includes: a key unit, configured to decrypt the received PIN code by using the first key algorithm, and decrypt the locally stored PIN code by using the second key algorithm, where the comparing unit compares the two decrypted PIN codes to perform the PIN code verification.

In one embodiment, the photon-based CA authentication terminal sends, in response to failed PIN code verification, an error message to the client.

In one embodiment, the system further includes the client, connected to the photon-based CA authentication terminal by using a USB port, where the client submits the user certificate to a certificate authentication gateway, to perform the CA certificate authentication.

In one embodiment, the client submits the user certificate and a certificate device password input by the user to the certificate authentication gateway, to perform the CA certificate authentication.

BRIEF DESCRIPTION OF DRAWINGS

After a detailed description of the embodiments of the present disclosure is read with reference to the following accompanying drawings, the foregoing features and advantages of the present application can be better understood. In the accompanying drawings, the components are not necessarily drawn to scale, and components having similar related characteristics or features may have the same or similar reference numerals.

DESCRIPTION OF EMBODIMENTS

With reference to accompanying drawings and specific embodiments, the following describes the present application in detail. It should be noted that aspects described below with reference to the accompanying drawings and the specific embodiments are merely examples, and shall not to be construed as any limitation on the protection scope of the present application.

Figure 1:
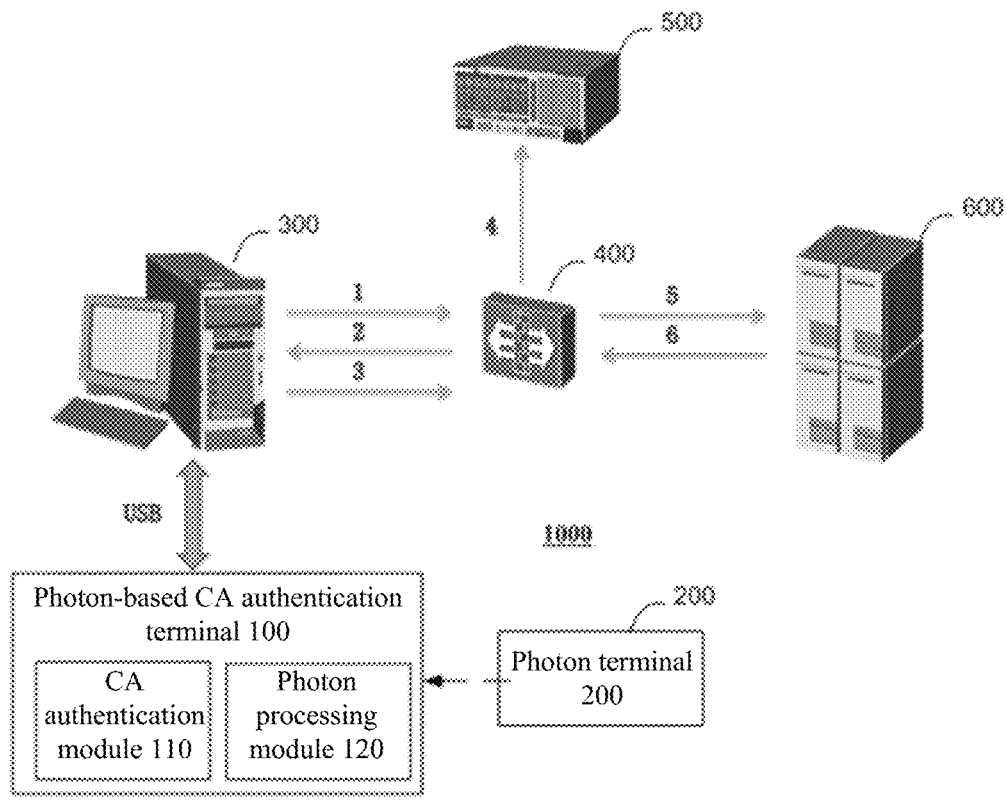
FIG. 1 shows a block diagram of architecture of a photon authentication system according to an aspect of the present application.

FIG. 1 shows a block diagram of architecture of a photon-based CA authentication system 1000 according to an aspect of the present application. As shown in FIG. 1, a photon-based CA authentication terminal 100 is connected to a client 300 by a USB port. A certificate authentication gateway 400 is deployed between the client 300 and a server 600 and is deployed in series. All information interactions between the client 300 and the server 600 pass through the authentication gateway 400. The authentication gateway 400 is responsible for performing a complete certificate authentication process of the client 300 and encrypted transmission of data. A request can really reach the server only after the client 300 is successfully verified by the authentication gateway.

The photon-based CA authentication system 1000 may further include a photon terminal 200. A user uses the photon terminal 200 to perform preliminary photon verification against the photon-based CA authentication terminal 100, and subsequent CA authentication is performed only after successful preliminary photon verification.

According to an aspect of the present application, the user sends an optical signal including a user ID to the photon-based CA authentication terminal 100 by using the photon terminal 200, and a photon processing component 120 of the photon-based CA authentication terminal 100 receives the optical signal and performs photon verification.

Preferably, the photon terminal 200 includes a fingerprint recognition component that can perform fingerprint recognition on the user. The photon terminal 200 sends the optical signal only after the user passes the fingerprint recognition. The photon terminal 200 may be in a form of a card, for example, an all-in-one photon card.

Figure 2:
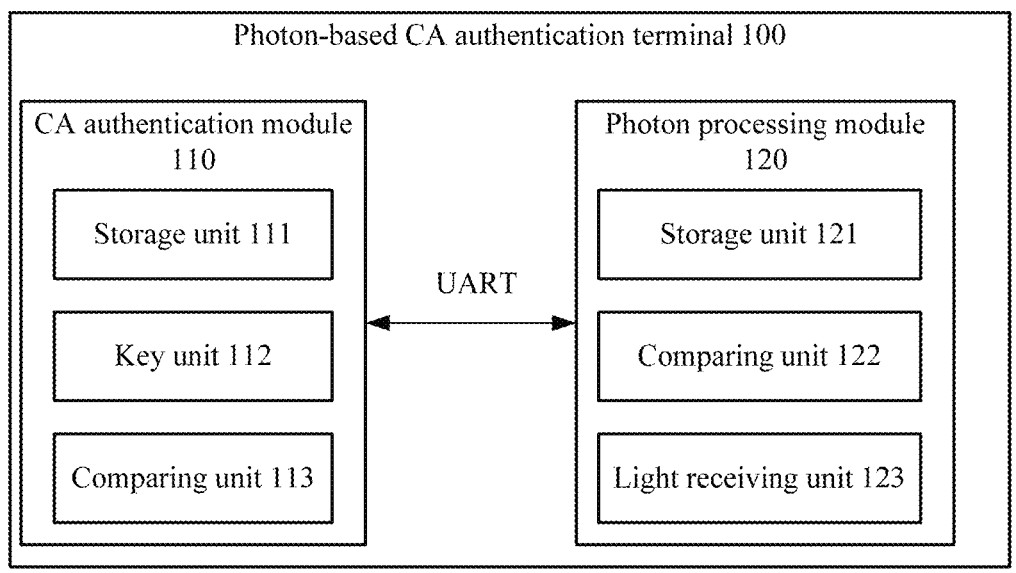
FIG. 2 shows a block diagram of a photon-based CA authentication terminal according to an aspect of the present application.

FIG. 2 shows a block diagram of a photon-based CA authentication terminal 100 according to an aspect of the present application.

As shown in FIG. 2, the photon-based CA authentication terminal 100 may include two parts: a CA authentication component 110 and the photon processing component 120. The two components can communicate by using a UART protocol. The photon processing component 120 is mainly responsible for performing preliminary photon verification against a user. When the two components communicate by using the UART protocol, the photon-based CA authentication terminal 100 may be an integrated device, for example, an online banking USB key with a photon receiving function.

In other implementation manner, the CA authentication component 110 and the photon processing component 120 may also be a complete set of instruments encapsulated in different devices. For example, the CA authentication component 110 may be an existing USB-type electronic password card with a CA authentication function, and the photon processing component 120 may be a photon receiving end only used to receive an optical signal. The two are respectively connected to a computer by using a USB port to form the complete set of instruments.

The photon processing component 120 first may include a light receiving unit 123, and accordingly, the photon terminal 200 may include a light emitting unit (not shown), so that the two can perform optical communication.

Generally, the light emitting unit (for example, an encoding part) of the photon terminal 200 may encode original communication data, for example, a user ID, in any encoding manner. Common encodings may include NRZ encoding, NRZI encoding, NRZI inversion count encoding, and the like. The NRZ encoding uses 1 to represent a high level, and 0 to represent a low level. The NRZI encoding uses a signal inversion, that is, a transition between the high level and the low level, to represent a logic, for example, 1 (0), and uses a state in which high and low levels of signals remain unchanged to represent another logic, for example, 0 (1). RZ pulse count encoding adds n bits of original information into a group, sets an inter-group time interval between two adjacent groups of signals, and uses a quantity of pulses in each group to represent information of n bits in the group of signals. According to the RZ encoding, one pulse is used to indicate information 00, and three pulses are used to indicate information 10.

The NRZI inversion count encoding also adds n bits of original information into a group, and sets an inter-group time interval between two adjacent groups of signals. Different from the RZ pulse count encoding, the NRZI uses a quantity of inversions from the high level to the low level (or from the low level to the high level) in each group to respectively represent information of n bits in the group of signals.

The light emitting unit (for example, a light emitting part, such as an LED) may transmit a received encoded signal in a form of visible light by using, for example, light-emitting to represent a high level signal and no-light-emitting to represent a low level signal.

The light receiving unit 123 may be used to receive a visible light signal emitted by the photon terminal 200 and convert the visible light signal into a digital signal. For example, for high-frequency blinking generated by an LED light, presence of light may indicate a high level, and absence of light may indicate a low level, or vice versa, thereby converting the received visible light signal into the digital signal. The light receiving unit 123 (for example, a photoelectric conversion part) forms an electrical pulse signal by means of photoelectric conversion by using characteristics of an electrical signal and an optical signal of a photodiode. In practice, since relative positions of the photon terminal 200 and the photon-based CA authentication terminal 100 are different, that is, strength of an optical signal emitted by the photon terminal 200 to the light receiving unit 123 every time is different, strength of an electrical signal thereof is also different, so that it is necessary to perform rectification comparison for a formed current. For example, when a value of a current passing through a diode is higher than a certain threshold value, a photoelectric conversion circuit adjusts an output voltage level value to a high level; and when a value of a current passing through a photodiode is lower than a certain threshold value, a photoelectric conversion circuit adjusts an output voltage level to a low level. The threshold values are set by using a mathematical model according to different environments. If a distance is too far, the threshold values may be reduced, and if a distance is close, the threshold values may be increased relatively. Through the above process, a level can be adjusted to a certain range, to ensure a correct pulse shape, and ensure sampling accuracy as far as possible.

The light receiving unit 123 (for example, a decoding part) further decodes the obtained digital signal to recover the original communication data, for example, the user ID sent by the photon terminal 200.

After the user passes fingerprint recognition, the photon terminal 200 sends an optical signal including the user ID to the photon processing component 120, and the light receiving unit 123 receives and processes the optical signal, to obtain the user ID. In addition to the above-described processing, the light receiving unit 123 may perform A/D conversion and decryption processing (when the user ID is encrypted).

After obtaining the user ID from the photon terminal 200, the photon processing component 120 may verify the user ID, and if the verification is successful, the photon-based CA authentication terminal 100 may provide a user certificate to the client 300 by using, for example, a USB port, to perform CA certificate authentication. For example, the user certificate is stored in a storage unit 111 of the CA authentication component 110, and at least as long as the photon verification is successful, the CA authentication component 110 can provide the user certificate for CA authentication.

The photon processing component 120 mainly includes two parts in function: a light receiving part, such as the light receiving unit 123 described above, and a verifying part, such as a comparing unit 122 described in detail below.

In this case, the photon-based CA authentication terminal 100 performs device initialization at the beginning, the client 300 delivers the user ID to the photon-based CA authentication terminal 100 by using a USB port, the photon processing component 120 encrypts the user ID and stores the user ID in the storage unit 121, and the user ID is a value same as that in the photon terminal 200.

Accordingly, when the photon verification is performed, the comparing unit 122 may compare the user ID obtained by the light receiving unit 123 with the user ID in the storage unit 121. If the two are consistent, the comparing unit 122 determines that the user ID verification is successful, or if the two are inconsistent, the comparing unit 122 determines that the user ID verification fails. In a case in which the user ID in the storage unit 121 is an encrypted user ID, the photon processing component 120 further needs to decrypt it first and then compare the decrypted user ID with the user ID obtained by the light receiving unit 123.

As described above, when the photon verification is successful, the CA authentication component 110 may submit a user certificate to the client 300, and when the photon verification fails, the photon-based CA authentication terminal 100 sends an error message to the client 300 by using the USB port.

In a particular embodiment, when the photon verification is successful, the CA authentication component 110 needs to further perform PIN code verification. The user certificate is provided to the client 300 for CA authentication only when the PIN code verification is successful, and when the PIN code verification fails, the photon-based CA authentication terminal 100 sends an error message to the client 300.

In this embodiment, when the photon-based CA authentication terminal 100 performs the device initialization at the beginning, the client 300 delivers a PIN code allocated by the certificate authentication gateway 400 to the photon-based CA authentication terminal 100 by using the USB port. For the PIN code, each of the CA authentication component 110 and the photon processing component 120 maintains the PIN code, and stores the PIN code by using different AES keys.

For example, the PIN code in the storage unit 111 of the CA authentication component 110 is a PIN code encrypted using a first key algorithm, such as a PIN code encrypted using AES1, and the PIN code in the storage unit 121 of the photon processing component 120 is a PIN code encrypted using a second key algorithm, such as a PIN code encrypted using AES2.

After an encrypted PIN code sent by the photon processing component 120 by using the UART protocol is received, a key unit 112 of the CA authentication component 110 may use the second key algorithm, for example, on the basis of AES2, to decrypt the received PIN code, and use the first key algorithm, for example, on the basis of AES1, to decrypt the locally stored PIN code, and then compare the two. If the two are consistent, the key unit 112 determines that the PIN code verification is successful, or if the two are inconsistent, the key unit 112 determines that the PIN code verification fails.

When the PIN code verification is successful, the CA authentication terminal 110 may send the user certificate to the client 300, and when the PIN code verification fails, the CA authentication terminal 110 may send an error message to the client.

When receiving the user certificate, the client 300 may submit the user certificate to the certificate authentication gateway 400 to perform CA certificate authentication. In general, the client 300 further needs to simultaneously submit a certificate device password input by the user to the certificate authentication gateway 400 for the CA certificate authentication.

When the user wants to request a service through the client, as shown in FIG. 1, the client 300 sends a connection request to an application server 600, and the request first arrives at the authentication gateway 400, as indicated by an arrow numbered 1. The certificate authentication gateway 400 requires the user to submit a user certificate, as indicated by an arrow numbered 2. The client 300 prompts the user to input the certificate device password and submits the user certificate to the server, as indicated by an arrow numbered 3. The authentication gateway 400 verifies the acquired user certificate, including the validity of the certificate itself, a trust certificate chain, blacklist verification, or OCSP verification, as indicated by an arrow numbered 4. If the verification is successful, the authentication gateway 400 may send the request to the real server 600 and attach user certificate information to the request, as indicated by an arrow numbered 5. The server 600 acquires an identity of the user from the request, as indicated by an arrow numbered 6.

Figure 3:
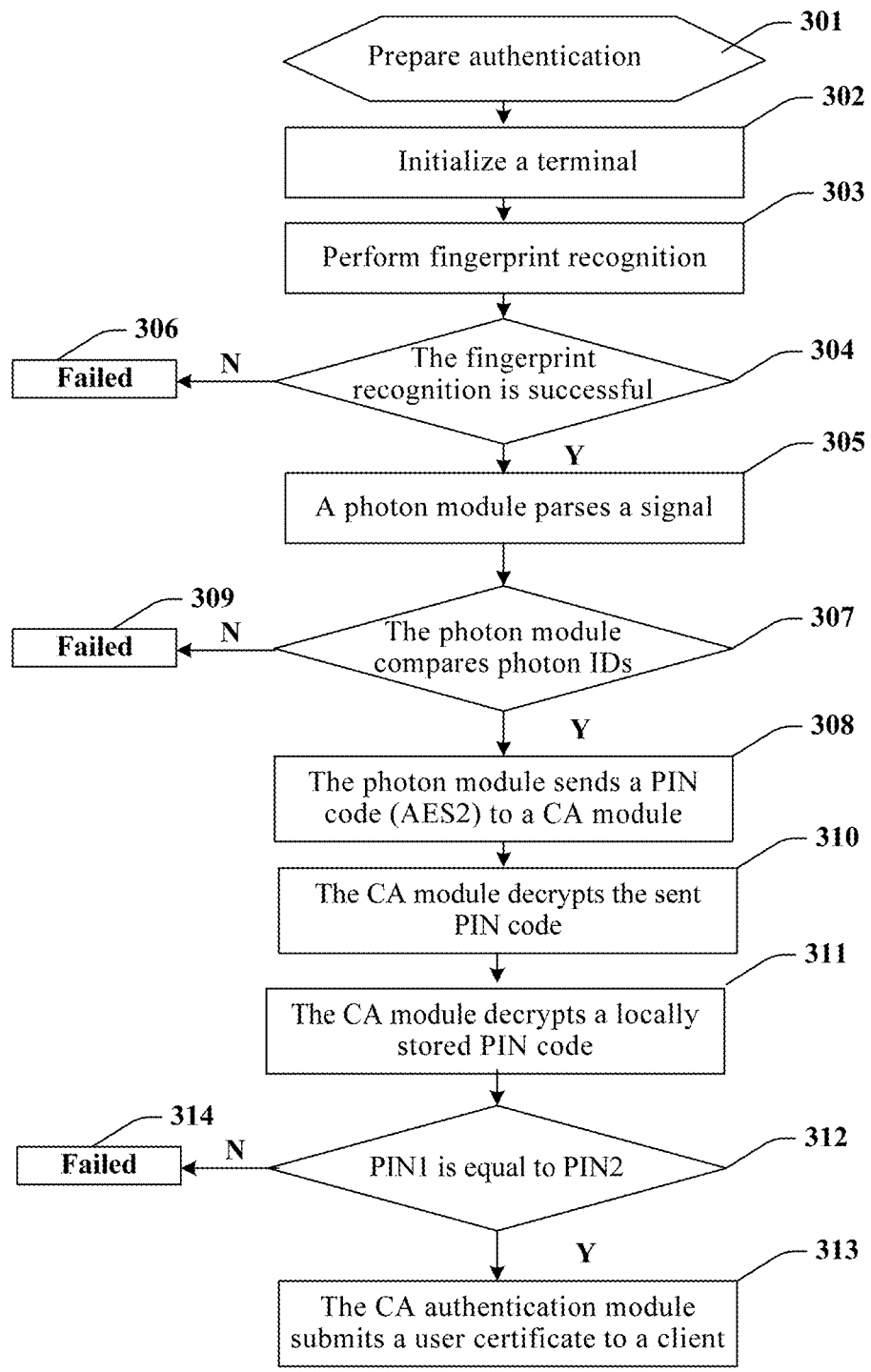
FIG. 3 shows a flowchart of a photon-based CA authentication method according to an aspect of the present application.

FIG. 3 shows a flowchart of a photon-based CA authentication method 300 according to an aspect of the present application. As shown in FIG. 3, the method 300 may include the following steps:

Step 301: Prepare authentication.

At this time, the photon-based CA authentication terminal 100 is connected to the client 300 by using USB;

Step 302: Initialize a terminal.

The photon-based CA authentication terminal 100 may acquire a PIN code and a user ID.

Step 303: Perform fingerprint recognition.

If a user wants to perform photon verification by using the photon terminal 200 to send an optical signal, the user needs to input fingerprint information to perform the fingerprint recognition.

Step 304: If the fingerprint recognition is successful, the process proceeds to step 305, or if the fingerprint recognition fails, the process proceeds to step 306.

Step 305: The photon processing component 120 parses the received optical signal to obtain the user ID.

Step 306: Report an error to the client 300.

Step 307: The photon processing component 120 compares the received user ID with a locally stored user ID to perform the photon verification. If the verification is successful, the process proceeds to step 308, or if the verification fails, the process proceeds to step 309.

Step 308: The photon processing component 120 sends the PIN code to the CA authentication component 110.

The PIN code herein may be a PIN code encrypted by using AES2.

Step 310: The CA authentication component 110 decrypts the received PIN code.

Correspondingly, the CA authentication component 110 may use AES2 to decrypt the PIN code.

Step 311: The CA authentication component 110 decrypts the locally stored PIN code.

The CA authentication component 110 may use, for example, AES1, to decrypt the PIN code herein.

Step 312: Compare whether the two are consistent. If the two are consistent, the process proceeds to step 313, or if the two are inconsistent, the process proceeds to step 314.

Step 313: The CA authentication component 110 submits the user certificate to the client 300.

Step 314: Report an error to the client 300.

While the above method is illustrated and described as a series of actions to simplify the explanation, it should be understood and comprehended that these methods are not limited by order of the actions. According to one or more embodiments, some actions may occur in different order and/or may occur concurrently with other actions illustrated and described herein or other actions that are not illustrated or described herein but are understood by persons skilled in the art.

In the present application, fingerprint recognition is performed first, followed by photon ID verification, and finally CA authentication. A person, a photon card, and an authentication terminal are fully bound. This can effectively prevent a certificate abuse phenomenon, improving an authentication security level.

For a clearer explanation of the above steps, the following provides a practical example to elaborate and describe the above steps:

First, the following person information table is created on the server:

| Work Number | Name | Photon ID | Authorized Computer Number |
|---|---|---|---|
| 123 | Zhang San | 56847 | A1111 |
| 124 | Li Si | 12548 | B2222 |

That is, an employee Zhang San is authorized to use only a device with the computer number being A1111.

If a manner of only using CA authentication in the prior art is used, Zhang San can legally access an authorized device by using a device carrying a CA certificate, such as a USB memory. However, the device carrying a CA certificate is not bound to Zhang San. If Zhang San lends the CA certificate device to Li Si, because the CA certificate device is not bound to a user, Li Si still can legally start the A1111 device when using the CA certificate device, resulting in a security risk.

If the solution in the embodiments of the present application is used, Zhang San and his/her CA certificate are bound to each other in a manner of photon ID verification: Firstly, fingerprint recognition is performed, and if the fingerprint recognition is successful, a current operator is confirmed as Zhang San, and then photon verification is performed. If a photon ID is valid, the CA authentication component is started to confirm that Zhang San has a valid CA certificate device. CA authentication is finally performed to confirm that Zhang San has rights to use the device.

Compared with the original CA authentication solution, the solution used in the present application binds the user and a CA certificate device allocated to the user together in a manner of photon ID verification, so that others cannot replace to use, thereby increasing safety of device use. In this embodiment, three verifications are performed. Firstly, fingerprint recognition is performed, followed by photon ID verification, and finally CA authentication. This effectively prevents a certificate abuse phenomenon, improving an authentication security level.

Persons skilled in the art are further aware that, various illustrative logical boards, components, circuits and algorithm steps described with reference to the embodiments disclosed herein may be implemented as electronic hardware or computer software or a combination thereof. In order to clearly describe interchangeability between hardware and software, various illustrative components, frames, components, circuits, and steps are generically described above in the form of their functionality. Whether the functionality is implemented as hardware or software depends on the specific application and design constraints applied to an overall system. Persons skilled in the art may implement the described functionality for each specific application in different manners, but it should not be considered that the implementation goes beyond the scope of the present application.

Various illustrative logical boards, components, and circuits described in the embodiments disclosed herein may be implemented or executed by a universal processor, a digital signal processor (DSP), an application-specific integrated circuit (ASIC), a field programmable gate array (FPGA), or other programmable logical components, stand-alone gates or transistor logics, stand-alone hardware components, or any combination designed to implement functions described herein. The universal processor may be a microprocessor, but in an alternative solution, the processor may be any conventional processor, controller, microcontroller, or state machine. The processor may also be implemented as a combination of computing devices, such as a combination of a DSP and a microprocessor, multiple microprocessors, one or more microprocessors that collaborate with a DSP core, or any other similar configurations.

The steps of methods or algorithms described with reference to the embodiments disclosed herein may be reflected directly in hardware, a software component executed by a processor, or a combination thereof. The software component may camp on a RAM memory, a flash memory, a ROM memory, an EPROM memory, an EEPROM memory, a register, a hard disk, a movable disk, a CD-ROM, or any other forms of storage medium known in the art. An illustrative storage medium is coupled to a processor so that the processor can read and write information from/into the storage medium. In an alternative solution, the storage medium may be integrated into the processor. The processor and the storage medium may camp on the ASIC. The ASIC may camp on a user terminal. In an alternative solution, the processor and the storage medium may camp on a user terminal as stand-alone components.

The foregoing description of the present disclosure is provided to enable any person skilled in the art to make or use the present disclosure. Various modifications made to the present disclosure are apparent to persons skilled in the art, and general principles defined herein may be applied to other variations without departing from the spirit or scope of the present disclosure. Therefore, the present disclosure is not intended to be limited to examples and designs described herein, but should be granted the widest range consistent with principles and novelty disclosed herein.

What is claimed is:

1. A photon-based Certificate Authority (CA) authentication method, comprising:
   receiving, by a photon-based CA authentication terminal, an optical signal from a photon terminal, wherein the optical signal comprises a user ID;
   verifying the user ID comprised in the optical signal; and
   providing, in response to the verifying of the user ID being successful, a user certificate to a client to perform CA certificate authentication;
   wherein the providing, in response to the verifying of the user ID being successful, the user certificate to the client to perform the CA certificate authentication comprises:
   performing, in response to the verifying of the user ID being successful, by the photon-based CA authentication terminal, PIN code verification; and
   providing, in response to the PIN code verification being successful, the user certificate to the client to perform the CA certificate authentication,
   wherein the photon-based CA authentication terminal comprises a CA authentication component and a photon processing component, and the performing the PIN code verification comprises: transferring, in response to the verifying of the user ID being successful, by the photon processing component, a PIN code to the CA authentication component; and comparing, by the CA authentication component, the received PIN code received from the photon processing component with a locally stored PIN code, to perform the PIN code verification, and responsive to determining that the received PIN code and the locally stored PIN code are consistent, determining that the PIN code verification is successful, or responsive to determining that the received PIN code and the locally stored PIN code are inconsistent, determining that the PIN code verification fails;
   wherein the PIN code transferred by the photon processing component is a PIN code encrypted using a first key algorithm, and the PIN code locally stored by the CA authentication component is a PIN code encrypted using a second key algorithm, and the comparing, by the CA authentication component, the received PIN code received from the photon processing component with the locally stored PIN code comprises: decrypting the received PIN code by using the first key algorithm; decrypting the locally stored PIN code by using the second key algorithm; and comparing the two decrypted PIN codes to perform the PIN code verification.

2. The photon-based CA authentication method according to claim 1, further comprising:
   performing, by the photon terminal, user fingerprint recognition; and sending, in response to the user fingerprint recognition being successful, the optical signal comprising the user ID.

3. The photon-based CA authentication method according to claim 1, wherein the verifying the user ID comprised in the optical signal comprises:
comparing the user ID comprised in the optical signal with a locally stored ID; and
responsive to determining that the user ID and the locally stored ID are consistent, determining that the verifying of the user ID is successful, or responsive to determining that the user ID and the locally stored ID are inconsistent, determining that the verifying of the user ID fails.

4. The photon-based CA authentication method according to claim 1, further comprising:
sending, in response to failed user ID verification, an error message to the client.

5. The photon-based CA authentication method according to claim 1, further comprising:
sending, in response to failed PIN code verification, an error message to the client.

6. The photon-based CA authentication method according to claim 1, further comprising:
submitting, by the client, the user certificate to a certificate authentication gateway, to perform the CA certificate authentication.

7. The photon-based CA authentication method according to claim 6, further comprising:
submitting, by the client, the user certificate and a certificate device password input by a user to the certificate authentication gateway, to perform the CA certificate authentication.

8. A photon-based CA authentication system, comprising:
a photon-based CA authentication terminal, configured to:
receive an optical signal from a photon terminal and verify a user ID comprised in the optical signal, and
provide, in response to the verifying of the user ID being successful, a user certificate to a client to perform CA certificate authentication;
wherein the photon-based CA authentication terminal is further configured to perform, in response to the verifying of the user ID being successful, a PIN code verification, and provide, in response to the PIN code verification being successful, the user certificate to the client to perform the CA certificate authentication;
wherein the photon-based CA authentication terminal is configured to:
locally store a PIN code in a storage unit of a CA authentication component of the photon-based authentication terminal; and
compare, using the CA authentication component, a received PIN code received from a photon processing component of the photon-based CA authentication terminal with the locally stored PIN code, to perform the PIN code verification, and responsive to determining that the received PIN code and the locally stored PIN code are consistent, determine that the PIN code verification is successful, or responsive to determining that the received PIN code and the locally stored PIN code are inconsistent, determine that the PIN code verification fails;
wherein the PIN code received from the photon processing component is a PIN code encrypted using a first key algorithm, and the PIN code locally stored by the CA authentication component is a PIN code encrypted using a second key algorithm, and the photon-based CA authentication terminal is configured to: decrypt the received PIN code received from the photon processing component by using the first key algorithm, and decrypt the locally stored PIN code by using the second key algorithm, wherein the two decrypted PIN codes are compared to perform the PIN code verification.

9. The photon-based CA authentication system according to claim 8, further comprising:
the photon terminal, configured to perform user fingerprint recognition, and send, in response to the user fingerprint recognition being successful, the optical signal comprising the user ID to the photon-based CA authentication terminal.

10. The photon-based CA authentication system according to claim 8, wherein the photon-based CA authentication terminal is further configured to:
locally store a user ID; and
compare the user ID comprised in the optical signal with the locally stored user ID, and responsive to determining that the user ID comprised in the optical signal and the locally stored user ID are consistent, determine that the verifying of the user ID is successful, or responsive to determining that the user ID comprised in the optical signal and the locally stored user ID are inconsistent, determine that the verifying of the user ID fails.

11. The photon-based CA authentication system according to claim 8, wherein the photon-based CA authentication terminal sends, in response to failed user ID verification, an error message to the client.

12. The photon-based CA authentication system according to claim 8, wherein the photon-based CA authentication terminal sends, in response to failed PIN code verification, an error message to the client.

13. The photon-based CA authentication system according to claim 8, further comprising:
the client, connected to the photon-based CA authentication terminal by using a USB port, wherein the client submits the user certificate to a certificate authentication gateway, to perform the CA certificate authentication.

14. The photon-based CA authentication system according to claim 13, wherein the client submits the user certificate and a certificate device password input by a user to a certificate authentication gateway, to perform the CA certificate authentication.

* * * * *